United States Patent [19]

Brooks

[11] Patent Number: 4,968,371

[45] Date of Patent: Nov. 6, 1990

[54] METHOD FOR REMOVING A MARKING FROM A SURFACE

[75] Inventor: Lamar E. Brooks, Wellesley, Mass.

[73] Assignee: The Gillette Company, Boston, Mass.

[21] Appl. No.: 205,878

[22] Filed: Jun. 13, 1988

[51] Int. Cl.[5] ........................ B32B 31/00; B41J 29/00

[52] U.S. Cl. .................................... 156/241; 156/277; 156/344; 156/584; 15/425; 400/695

[58] Field of Search ............... 156/230, 241, 235, 277, 156/344, 584, 240, 272.2; 400/695, 696, 700; 15/424, 428; 219/552, 553

[56] References Cited

U.S. PATENT DOCUMENTS

| | | | |
|---|---|---|---|
| 2,721,821 | 10/1955 | Hoover | 156/272.2 |
| 3,464,534 | 9/1969 | Muncheryan | 197/181 |
| 3,553,421 | 1/1971 | Schawlow | 219/121 |
| 3,924,728 | 12/1975 | Brown et al. | 400/696 |
| 4,085,838 | 4/1978 | Pierce | 400/696 |
| 4,110,597 | 8/1978 | Elmore | 219/552 |
| 4,786,195 | 11/1988 | Hibino et al. | 400/696 |

OTHER PUBLICATIONS

A. L. Schawlow, "An Example of Lasar Erasing" Laser Focus; Sep. 1986, p. 9.

*Primary Examiner*—Robert A. Dawson
*Assistant Examiner*—Louis Falasco
*Attorney, Agent, or Firm*—Owen J. Meegan; Aubrey C. Brine; John P. Morley

[57] ABSTRACT

Method for removing a marking from a stratum surface involving the steps of superposing a pellucid film including a heat-softenable polymeric material over a marking so that the marking is in contact with the polymeric material and irradiating the marking and film with light energy to heat the marking and soften the polymeric material to thereby transfer the marking to the film.

8 Claims, 1 Drawing Sheet

METHOD FOR REMOVING A MARKING FROM A SURFACE

BACKGROUND OF THE INVENTION

Part 1. The Field of the Invention

This invention basically relates to novel, improved methods and apparatus for removing a marking from a stratum surface. Additionally, this invention relates to novel, improved methods and apparatus for correcting a marking on a surface by removing the marking and replacing it with another marking.

Part 2. Description of the Prior Art

The correction of markings such as written, typewritten or photodeposited markings on paper surfaces is well known to the art. Essentially, such corrections involve either initially removing the marking with an eraser or masking the marking with a correction fluid and replacing the removed or masked marking with another marking. Ideally, removal of the marking would represent the best approach for making such corrections. However, known erasers are notoriously ineffective for removing markings produced by pens, typewriters, or photodeposition apparatus. Such markings are extremely resistant to removal by erasers and are not satisfactorily removed unless excessive abrading force is used which adversely affects the quality of the substrate surface.

Correction fluids have been used extensively in the art as a preferred, more effective way to correct markings because of the shortcomings of erasers. Such correction fluids include an opacifying agent dispersed in a liquid which usually includes a soluble film-forming material. In use, the fluids are applied to the marking, allowed to dry, and a new marking is applied to the dried, coalesced residue of the fluid. Some disadvantages of correction fluids include the time required to apply and dry the fluid and incomplete masking of the marking usually because of "bleeding" resulting from interaction between the marking and the ingredients of the fluids which usually include an organic solvent. Another disadvantage is that the corrected marking is oftentimes detectable unless the coalesced residue of the fluid closely corresponds in texture and color of the substrate surface. Accordingly, there is an outstanding need in the art for a method which can quickly and effectively remove a marking from a surface without encountering the inconveniences involved in abrading or masking the marking. This invention is addressed to that need and provides an especially effective response to that need.

SUMMARY OF THE INVENTION

The invention presents to the art novel, improved methods for removing a marking such as a written, typewritten, or photodeposited marking from a stratum surface. Removal of the marking is achieved by arranging a pellucid heat-conductive film which includes or carries a heat softenable polymeric material with the marking so that the polymeric material is in contact with the marking. The polymeric material and marking are then irradiated with sufficient radiant visible light energy to heat the marking and the polymeric material to modify the surface energies of the marking and polymeric material so that the marking preferentially adhers to the polymeric material rather than to the stratum surface. Accordingly, the marking is transferred to the film which is then lifted from the stratum surface.

Effective removal of the marking is considered to be primarily a result of the differentials existing between the light-absorbing characteristics (or reflection coefficients) of the marking and the stratum surface surrounding the marking. For example, the reflection coefficient of ordinary white paper to the visible spectrum is on the order of about 80 percent, and therefore, the absorption coefficient is about 20 percent. On the other hand, the absorption coefficient of tYpewriter ink is about 99 percent. Accordingly, during the brief period of irradiation, the lighter colored surface adjacent the marking reflects the radiant light energy away thereby generating relatively little heat. However, the darker marking absorbs the light energy and converts it to heat to thereby heat the marking and the polymeric material in contact with the marking and transfer the marking to the polymeric material. Accordingly, after irradiation, the heated marking and polymeric material cool and remain in contact with each other, and the polymeric material and transferred marking are lifted from the stratum surface. I presently believe that the transfer of the marking to the polymeric material involves changes in the surface energies of the marking and superposed material generated by the conversion of light to heat which causes softening of the marking and/or material and probably changes at least a portion of the meniscus of the marking. However, my belief is presented only as a proposed explanation of the transfer mechanism.

THE DRAWING

FIG. 1 is a diagrammatic, cross-sectional view of apparatus suitable for use in the practice of the invention.

DESCRIPTION OF PREFERRED EMBODIMENTS

Figure 1:
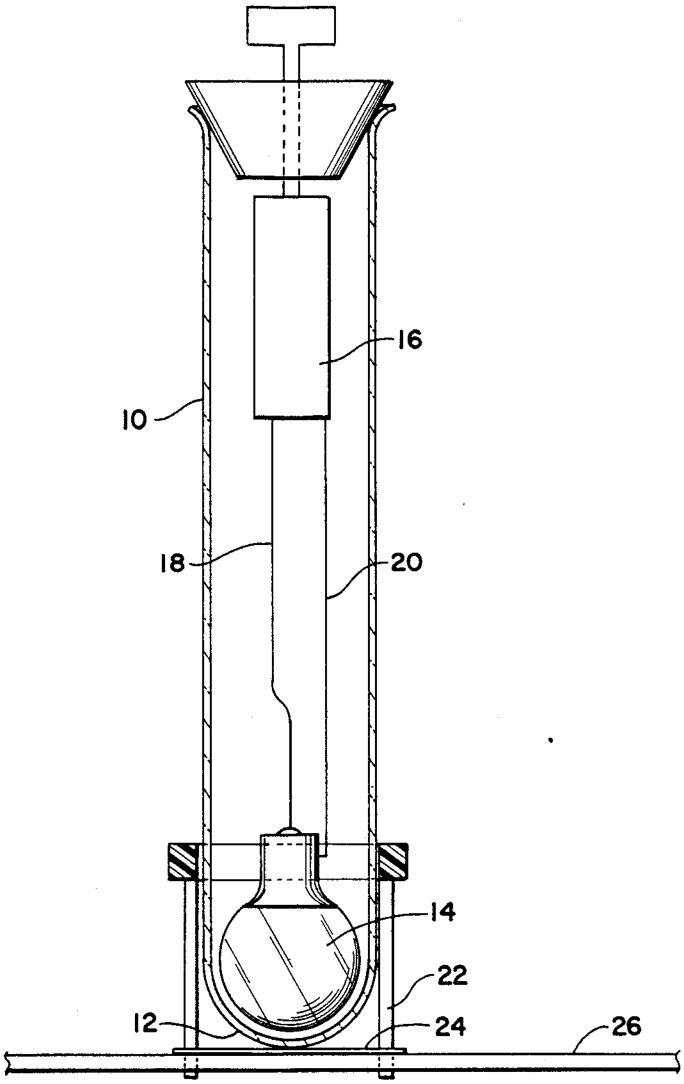

In the first step of the method of the present invention, a pellucid film, which includes or carries a heat-softenable polymeric material, is arranged in contact with a marking so that the marking and polymeric material are in contact with each other. For the purposes of this invention, "a pellucid film" means a film (or a plurality of films) which can transmit light and can be transparent or translucent although transparent films are preferred. Heat-softenable polymeric materials suitable in the practice of the invention are heat-activatable (hot melt) adhesives having a melt index between about 3 to about 150 and preferably having a melt index between about 5 to about 50. Especially preferred polymeric materials are heat-softenable ethylene-vinylacetate and vinylacetate vinylchloride copolymers especially such copolymers containing from about 5 to about 30 percent by weight vinylacetate. Other suitable heat-softenable polymeric materials include polymers and copolymers of vinylidene chloride; vinylbutyral and styrene. As mentioned, the polymeric material may be included in the film, or the film may carry the polymeric material. For example, a MYLAR film material or other pellucid substrate film material coated with a thin layer of a heat-softenable polymeric material may be suitably employed in the practice of the invention.

In the second step of the method of the invention, the marking is irradiated through the superposed film so that the absorbed radiation will heat the marking and contiguous portions of the film to a temperature at which the marking will adhere more to the film than to the stratum surface. The temperature, $U_c$, which is needed for transfer of the marking, may be at or near the melting temperature of the marking. As a practical matter, $U_c$ must equal the highest temperature required to transfer a variety of markings from various stratum surfaces to a given polymeric film material. For infinitely long durations of irradiation, the final temperature of the film, $U_{ss}$, is linearly related to the radient intensity by the thermal characteristics of the polymeric material and to a lesser degree by the thermal characteristics of the stratum surface. Accordingly, there is a minimum intensity input needed to cause the final temperature, $U_{ss}$, to reach the critical temperature, $U_c$, and any lower intensity will be ineffective.

In terms of duration, the temperature of the superposed film and marking can be quantified by summing an infinite series of exponential functions of time. For all practical purposes, the final temperature $U_{ss}$ can be considered to be achieved when the slowest of these individual exponential functions reaches about 95 percent of the final value of $U_{ss}$. That is, the film may be considered a temperature gradient resulting from heat transfer from the marking. At the time interval of 10 percent of the final value of $U_{ss}$, the superposed film exhibits a high temperature on one side and about ambient temperature at the center, progressing by heat transfer to a steady state. The time required to reach the final practical value is defined as Tpfv (time for practical final value). Intensities which produce temperatures greater than $U_c$ at a steady state basis may not reach $U_c$ when the duration is less than Tpfv. Conversely, when the intensity is too high, and/or the duration is longer than needed to reach $U_c$, the temperature may be so high as to char or discolor the stratum surface or to volatilize the marking and spread the marking on or into the stratum surface.

The selection of a visible light source providing an effective duration/intensity combination can be determined empirically without excessive difficulty. Moreover, classical analysis calculations can be used to provide reliable approximate maximum duration and minimum intensity limits needed to remove markings in accordance with the practice of the present invention. The standard text for such calculations is *Conduction of Heat in Solids*, Carslaw and Jaeger. Second Edition, Oxford Clarendon Press, 1959, which is the source for the calculations discussed herein. Essentially, the calculations involve finding two values. The first value is the time (duration) required for the polymeric film covering the marking to reach thermal equilibrium when power is applied constantly to one side. The second value is the power (intensity) needed to adequately heat the marking. These calculations will vary depending upon the thickness and/or conductivity of the polymeric film material. The minimum duration and maximum intensity limits are dictated primarily by practical considerations. For example, extremely short durations require extremely large and usually impractical, unnecessary intensities and vise-versa. Visible light sources capable of providing the desired combination of intensity and duration of irradiation for the practice of the invention include commercially available flashbulbs, high intensity strobe lights, and laser beam sources, among others.

The essential elements of apparatus for removing markings in accordance with the practice of the present invention include means to superpose a polymeric film on the marking and means to irradiate the film and marking with visible light energy. FIG. 1 illustrates the elements of the apparatus in a rudimentary form. As shown, the apparatus includes a body 10 (a test tube) having a lower surface portion 12 which is light transmissive. Also arranged in body 10 is a visible light source 14 (a flashbulb) which is arranged in communication with surface 12. An activatable source of electrical current 16 is operationally connected to light source 14 by wires 18 and 20. In FIG. 1, electrical current source 16 is shown as a piezoelectric generator. Frame 22 is fixedly attached to body 10 and provides means to retain polymeric film 24 in close communication with surface 12 and surface 26 carrying a marking selected for removal.

In operation, polymeric film 24 retained by frame 22 is superposed on a selected marking carried on surface 26, usually a paper surface. Light source 14 is then activated by connecting current source 16 to light source 14 to thereby heat the marking and transfer the melted marking to superposed film 24 which is then lifted from surface 26. If desired, a new marking may be applied to the surface to replace the removed marking. Additional details of the invention will be more fully appreciated by reference to the following Example 1, which presents an illustrative, non-limiting embodiment of the invention.

EXAMPLE 1

A 3 mil MYLAR film material carrying a 2 mil coating of an ethylene-vinylacetate having a melt index of about 43 and containing about 28 percent by weight vinylacetate was superposed on a conventional typewritten marking on a paper sheet. The coating was arranged in contact with the marking. A flashbulb sold by General Electric under the tradename GE-M3 was connected to a piezoelectric power source and placed in the bottom of a one-inch diameter glass laboratory test tube. The bottom of the test tube was positioned directly above the film and marking, and the tube was held in contact with the film by light hand pressure. The flashbulb was fired, and thereafter the film with the transferred marking was lifted from the paper surface. Substantially complete removal of the marking from the surface was achieved, and no marking residue or discoloration was observed in the area of the surface from which the marking was removed.

In the above Example, the output intensity of the GE-M3 flashbulb was about 16,000 lumen sec. for a duration of about 17.5 milliseconds. Assuming the intensity is an average figure, power would be about 914,806 lumens so that the power of the flashbulb is about 1338 watts (1 lumen = 1/683 watt). The normal line spacing for typewritten markings is one-sixth of an inch, and the area of a circle having a one-sixth inch diameter is 0.0218 square inch. Assuming that the power was radiated equally over all of the surface of the one-inch diameter test tube holding the flashbulb, the power would be distributed over 0.785 square inches. The ratio of the area of the circle containing the marking to the total area over which the power was distributed was 0.028. Accordingly, the marking within the circle in the Example was exposed to about 37 watts.

As mentioned before, calculations based on classical analysis can provide reliable approximate maximum duration and minimum intensity limits needed to remove markings in accordance with the practice of the invention. Calculations for the duration needed to heat a 5 mil thick polyester film to a thermal equilibrium temperature of 150° C. above ambient establish that the duration need not exceed about 275 ms. Calculations for the intensity needed to raise the 5 mil thick polyester to 150° C. above ambient establish that the required minimum total power per unit area is 4.14×105 watts/-meter$^2$. Since the marking is within the area of a circle having a one-sixth inch diameter (0.0218 square inches or $1.4\times10^{-5}$ meters$^2$), the calculated minimum power needed to melt the marking is 5.8 watts.

A comparison of the calculated maximum duration and minimum intensity values with the actual duration and intensity values of Example 1 provides interesting information relating to alternative useful duration/intensity combinations. Since the duration in Example 1 is much shorter than the calculated time needed to reach Tpfv, we can estimate that the marking reached only about 23 percent of the steady temperature which would have been reached at the calculated maximum duration (275 ms). Moreover, the marking of Example 1 was exposed to 37 watts, while the calculated minimum required power is 5.8 watts. Since the duration in Example 1 represents only about 23 percent of the calculated steady state temperature, it would be reasonable to expect that 8.6 watts (0.23×37 watts) together with the calculated maximum duration would provide results equal to those achieved in Example 1.

It should be apparent from the above description that the invention presents to the art an extremely fast, relatively simple but highly effective method for removing markings from a stratum surface. Unlike methods known to the art, the invention does not involve abrading of the marking which normally results in incomplete removal of the marking and undesirable alteration of the quality of the surface carrying the marking. Additionally, the application of a masking composition is not involved, and the time required to apply and dry such compositions and other complications are avoided. Accordingly the invention presents to the art improved, unexpected, and desirable advantages over the methods and apparatus known to the art at the time the present invention was made.

What is claimed is:

1. A method for removing a unitary marking from a stratum surface comprising the steps of:
   arranging a pellucid film comprising a heat softenable polymeric material having one film surface in superposition with a unitary marking carried by a stratum surface and the superposed film surface in spaced relation with a light energy source;
   transferring the marking substantially completely to the polymeric material by irradiating the unitary marking through the pellucid film with sufficient light energy to a temperature at which the substantially complete marking has greater adherence to the stratum surface;
   removing the pellucid film with the unitary marking adhered thereto from superposition with the stratum surface to thereby remove the marking from the stratum surface; and
   applying a marking to the stratum surface to replace the removed marking.

2. A method of claim 1 where the polymeric material is dispersed in the film.

3. A method of claim 1 where the polymeric material is carried by the film as a layer.

4. A method of claim 1 where the polymeric material is a heat activatable adhesive having a melt index between about 3 to about 150.

5. A method of claim 4 where the polymeric material is a polymer or copolymer of vinyl acetate, vinylchloride, vinylidene chloride, vinyl butyral, styrene, and mixtures of these.

6. A method of claim 4 where the polymeric material is a copolymer of ethylene vinylacetate, vinylacetate vinylchloride, and mixtures of these.

7. A method of claim 1 where the film is transparent.

8. A method of claim 1 where the film is translucent.

* * * * *